US008922340B2

(12) United States Patent
Salter et al.

(10) Patent No.: US 8,922,340 B2
(45) Date of Patent: Dec. 30, 2014

(54) PROXIMITY SWITCH BASED DOOR LATCH RELEASE

(75) Inventors: Stuart C. Salter, White Lake, MI (US); Yun Shin Lee, Shelby Township, MI (US); Pietro Buttolo, Dearborn Heights, MI (US); Cornel Lewis Gardner, Romulus, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 254 days.

(21) Appl. No.: 13/609,390

(22) Filed: Sep. 11, 2012

(65) Prior Publication Data

US 2014/0069015 A1 Mar. 13, 2014

(51) Int. Cl.
*B60R 25/00* (2013.01)

(52) U.S. Cl.
USPC ........ 340/5.72; 340/5.7; 340/5.2; 340/426.28

(58) Field of Classification Search
USPC .............................. 340/5.72, 5.7, 5.2, 426.28
See application file for complete search history.

(56) References Cited

U.S. PATENT DOCUMENTS

| | | | |
|---|---|---|---|
| 3,382,588 | A | 5/1968 | Serrell et al. |
| 3,544,804 | A | 12/1970 | Gaumer et al. |
| 3,691,396 | A | 9/1972 | Hinrichs |
| 3,707,671 | A | 12/1972 | Morrow et al. |
| 3,826,979 | A | 7/1974 | Steinmann |
| 4,204,204 | A | 5/1980 | Pitstick |
| 4,205,325 | A | 5/1980 | Haygood et al. |
| 4,232,289 | A | 11/1980 | Daniel |
| 4,257,117 | A | 3/1981 | Besson |
| 4,290,052 | A | 9/1981 | Eichelberger et al. |
| 4,340,813 | A | 7/1982 | Sauer |
| 4,374,381 | A | 2/1983 | Ng et al. |
| 4,380,040 | A | 4/1983 | Posset |
| 4,413,252 | A | 11/1983 | Tyler et al. |
| 4,431,882 | A | 2/1984 | Frame |
| 4,446,380 | A | 5/1984 | Moriya et al. |
| 4,453,112 | A | 6/1984 | Sauer et al. |

(Continued)

FOREIGN PATENT DOCUMENTS

| | | |
|---|---|---|
| DE | 4024052 | 1/1992 |
| EP | 1152443 | 11/2001 |

(Continued)

OTHER PUBLICATIONS

U.S. Appl. No. 13/665,253, filed Oct. 31, 2012, entitled Proximity Switch Assembly Having Round Layer, (15 pages of specification and 7 pages of drawings) and Official Filing Receipt (3 pages).

(Continued)

*Primary Examiner* — Andrew Bee
(74) *Attorney, Agent, or Firm* — Vichit Chea; Price Heneveld LLP

(57) ABSTRACT

A vehicle door latch assembly includes a first proximity sensor on a first side of a door handle and a second proximity sensor on a second side of the door handle. The assembly also includes a latch operative to latch the door closed and to unlatch the door to allow the door to open. The assembly further includes control circuitry for activating the latch to unlatch the door based on an object such as an operator's hand sensed with both the first and second proximity sensors.

17 Claims, 4 Drawing Sheets

(56) References Cited

U.S. PATENT DOCUMENTS

| | | | | |
|---|---|---|---|---|
| 4,492,958 | A | 1/1985 | Minami | |
| 4,494,105 | A | 1/1985 | House | |
| 4,502,726 | A | 3/1985 | Adams | |
| 4,514,817 | A | 4/1985 | Pepper et al. | |
| 4,613,802 | A | 9/1986 | Kraus et al. | |
| 4,680,429 | A | 7/1987 | Murdock et al. | |
| 4,743,895 | A | 5/1988 | Alexander | |
| 4,748,390 | A | 5/1988 | Okushima et al. | |
| 4,758,735 | A | 7/1988 | Ingraham | |
| 4,821,029 | A | 4/1989 | Logan et al. | |
| 4,855,550 | A | 8/1989 | Schultz, Jr. | |
| 4,872,485 | A | 10/1989 | Laverty, Jr. | |
| 4,899,138 | A | 2/1990 | Araki et al. | |
| 4,901,074 | A | 2/1990 | Sinn et al. | |
| 4,905,001 | A | 2/1990 | Penner | |
| 4,924,222 | A | 5/1990 | Antikidis et al. | |
| 4,972,070 | A | 11/1990 | Laverty, Jr. | |
| 5,025,516 | A | 6/1991 | Wilson | |
| 5,033,508 | A | 7/1991 | Laverty, Jr. | |
| 5,036,321 | A | 7/1991 | Leach et al. | |
| 5,063,306 | A | 11/1991 | Edwards | |
| 5,108,530 | A | 4/1992 | Niebling, Jr. et al. | |
| 5,153,590 | A | 10/1992 | Charlier | |
| 5,159,159 | A | 10/1992 | Asher | |
| 5,159,276 | A | 10/1992 | Reddy, III | |
| 5,177,341 | A | 1/1993 | Balderson | |
| 5,215,811 | A | 6/1993 | Reafler et al. | |
| 5,239,152 | A | 8/1993 | Caldwell et al. | |
| 5,270,710 | A | 12/1993 | Gaultier et al. | |
| 5,294,889 | A | 3/1994 | Heep et al. | |
| 5,329,239 | A | 7/1994 | Kindermann et al. | |
| 5,341,231 | A | 8/1994 | Yamamoto et al. | |
| 5,403,980 | A | 4/1995 | Eckrich | |
| 5,451,724 | A | 9/1995 | Nakazawa et al. | |
| 5,467,080 | A | 11/1995 | Stoll et al. | |
| 5,477,422 | A | 12/1995 | Hooker et al. | |
| 5,494,180 | A | 2/1996 | Callahan | |
| 5,512,836 | A | 4/1996 | Chen et al. | |
| 5,548,268 | A | 8/1996 | Collins | |
| 5,566,702 | A | 10/1996 | Philipp | |
| 5,572,205 | A | 11/1996 | Caldwell et al. | |
| 5,586,042 | A | 12/1996 | Pisau et al. | |
| 5,594,222 | A | 1/1997 | Caldwell | |
| 5,598,527 | A | 1/1997 | Debrus et al. | |
| 5,670,886 | A | 9/1997 | Wolff et al. | |
| 5,681,515 | A | 10/1997 | Pratt et al. | |
| 5,730,165 | A | 3/1998 | Philipp | |
| 5,747,756 | A | 5/1998 | Boedecker | |
| 5,760,554 | A | 6/1998 | Bustamante | |
| 5,790,107 | A | 8/1998 | Kasser et al. | |
| 5,796,183 | A | 8/1998 | Hourmand | |
| 5,825,352 | A | 10/1998 | Bisset et al. | |
| 5,827,980 | A | 10/1998 | Doemens et al. | |
| 5,864,105 | A | 1/1999 | Andrews | |
| 5,867,111 | A | 2/1999 | Caldwell et al. | |
| 5,874,672 | A | 2/1999 | Gerardi et al. | |
| 5,917,165 | A | 6/1999 | Platt et al. | |
| 5,920,309 | A | 7/1999 | Bisset et al. | |
| 5,942,733 | A | 8/1999 | Allen et al. | |
| 5,963,000 | A | 10/1999 | Tsutsumi et al. | |
| 5,973,417 | A | 10/1999 | Goetz et al. | |
| 5,973,623 | A | 10/1999 | Gupta et al. | |
| 6,010,742 | A | 1/2000 | Tanabe et al. | |
| 6,011,602 | A | 1/2000 | Miyashita et al. | |
| 6,031,465 | A | 2/2000 | Burgess | |
| 6,035,180 | A | 3/2000 | Kubes et al. | |
| 6,037,930 | A | 3/2000 | Wolfe et al. | |
| 6,040,534 | A | 3/2000 | Beukema | |
| 6,157,372 | A | 12/2000 | Blackburn et al. | |
| 6,172,666 | B1 | 1/2001 | Okura | |
| 6,215,476 | B1 | 4/2001 | Depew et al. | |
| 6,219,253 | B1 | 4/2001 | Green | |
| 6,231,111 | B1 | 5/2001 | Carter et al. | |
| 6,275,644 | B1 | 8/2001 | Domas et al. | |
| 6,288,707 | B1 | 9/2001 | Philipp | |
| 6,292,100 | B1 | 9/2001 | Dowling | |
| 6,310,611 | B1 | 10/2001 | Caldwell | |
| 6,320,282 | B1 | 11/2001 | Caldwell | |
| 6,323,919 | B1 | 11/2001 | Yang et al. | |
| 6,369,369 | B2 | 4/2002 | Kochman et al. | |
| 6,377,009 | B1 | 4/2002 | Philipp | |
| 6,379,017 | B2 | 4/2002 | Nakabayashi et al. | |
| 6,380,931 | B1 | 4/2002 | Gillespie et al. | |
| 6,415,138 | B2 | 7/2002 | Sirola et al. | |
| 6,427,540 | B1 | 8/2002 | Monroe et al. | |
| 6,452,138 | B1 | 9/2002 | Kochman et al. | |
| 6,452,514 | B1 | 9/2002 | Philipp | |
| 6,456,027 | B1 | 9/2002 | Pruessel | |
| 6,457,355 | B1 | 10/2002 | Philipp | |
| 6,464,381 | B2 | 10/2002 | Anderson, Jr. et al. | |
| 6,466,036 | B1 | 10/2002 | Philipp | |
| 6,485,595 | B1 | 11/2002 | Yenni, Jr. et al. | |
| 6,529,125 | B1 | 3/2003 | Butler et al. | |
| 6,535,200 | B2 | 3/2003 | Philipp | |
| 6,537,359 | B1 | 3/2003 | Spa | |
| 6,559,902 | B1 | 5/2003 | Kusuda et al. | |
| 6,587,097 | B1 | 7/2003 | Aufderheide et al. | |
| 6,607,413 | B2 | 8/2003 | Stevenson et al. | |
| 6,614,579 | B2 | 9/2003 | Roberts et al. | |
| 6,617,975 | B1 | 9/2003 | Burgess | |
| 6,639,159 | B2 | 10/2003 | Anzai | |
| 6,652,777 | B2 | 11/2003 | Rapp et al. | |
| 6,654,006 | B2 | 11/2003 | Kawashima et al. | |
| 6,661,410 | B2 | 12/2003 | Casebolt et al. | |
| 6,664,489 | B2 | 12/2003 | Kleinhans et al. | |
| 6,713,897 | B2 | 3/2004 | Caldwell | |
| 6,734,377 | B2 | 5/2004 | Gremm et al. | |
| 6,738,051 | B2 | 5/2004 | Boyd et al. | |
| 6,740,416 | B1 | 5/2004 | Yokogawa et al. | |
| 6,756,970 | B2 | 6/2004 | Keely, Jr. et al. | |
| 6,773,129 | B2 | 8/2004 | Anderson, Jr. et al. | |
| 6,774,505 | B1 | 8/2004 | Wnuk | |
| 6,794,728 | B1 | 9/2004 | Kithil | |
| 6,795,226 | B2 | 9/2004 | Agrawal et al. | |
| 6,809,280 | B2 | 10/2004 | Divigalpitiya et al. | |
| 6,812,424 | B2 | 11/2004 | Miyako | |
| 6,819,316 | B2 | 11/2004 | Schulz et al. | |
| 6,819,990 | B2 | 11/2004 | Ichinose | |
| 6,825,752 | B2 | 11/2004 | Nahata et al. | |
| 6,834,373 | B2 | 12/2004 | Dieberger | |
| 6,841,748 | B2 | 1/2005 | Serizawa et al. | |
| 6,847,018 | B2 | 1/2005 | Wong | |
| 6,847,289 | B2 * | 1/2005 | Pang et al. ............... | 340/426.28 |
| 6,854,870 | B2 | 2/2005 | Huizenga | |
| 6,879,250 | B2 | 4/2005 | Fayt et al. | |
| 6,884,936 | B2 | 4/2005 | Takahashi et al. | |
| 6,891,114 | B2 | 5/2005 | Peterson | |
| 6,891,530 | B2 | 5/2005 | Umemoto et al. | |
| 6,897,390 | B2 | 5/2005 | Caldwell et al. | |
| 6,929,900 | B2 | 8/2005 | Farquhar et al. | |
| 6,930,672 | B1 | 8/2005 | Kuribayashi | |
| 6,940,291 | B1 | 9/2005 | Ozick | |
| 6,960,735 | B2 | 11/2005 | Hein et al. | |
| 6,962,436 | B1 | 11/2005 | Holloway et al. | |
| 6,964,023 | B2 | 11/2005 | Maes et al. | |
| 6,966,225 | B1 | 11/2005 | Mallary | |
| 6,967,587 | B2 | 11/2005 | Snell et al. | |
| 6,977,615 | B2 | 12/2005 | Brandwein, Jr. | |
| 6,987,605 | B2 | 1/2006 | Liang et al. | |
| 6,993,607 | B2 | 1/2006 | Philipp | |
| 6,999,066 | B2 | 2/2006 | Litwiller | |
| 7,030,513 | B2 | 4/2006 | Caldwell | |
| 7,046,129 | B2 | 5/2006 | Regnet et al. | |
| 7,053,360 | B2 | 5/2006 | Balp et al. | |
| 7,063,379 | B2 | 6/2006 | Steuer et al. | |
| 7,091,836 | B2 * | 8/2006 | Kachouh et al. ......... | 340/426.28 |
| 7,091,886 | B2 | 8/2006 | DePue et al. | |
| 7,098,414 | B2 | 8/2006 | Caldwell | |
| 7,105,752 | B2 | 9/2006 | Tsai et al. | |
| 7,106,171 | B1 | 9/2006 | Burgess | |
| 7,135,995 | B2 | 11/2006 | Engelmann et al. | |
| 7,146,024 | B2 | 12/2006 | Benkley, III | |
| 7,151,450 | B2 | 12/2006 | Beggs et al. | |
| 7,151,532 | B2 | 12/2006 | Schulz | |

(56) References Cited

U.S. PATENT DOCUMENTS

| | | | | |
|---|---|---|---|---|
| 7,154,481 | B2 | 12/2006 | Cross et al. | |
| 7,180,017 | B2 | 2/2007 | Hein | |
| 7,186,936 | B2 | 3/2007 | Marcus et al. | |
| 7,205,777 | B2 | 4/2007 | Schulz et al. | |
| 7,215,529 | B2 | 5/2007 | Rosenau | |
| 7,218,498 | B2 | 5/2007 | Caldwell | |
| 7,232,973 | B2 | 6/2007 | Kaps et al. | |
| 7,242,393 | B2 | 7/2007 | Caldwell | |
| 7,245,131 | B2 | 7/2007 | Kurachi et al. | |
| 7,248,151 | B2 | 7/2007 | Mc Call | |
| 7,248,955 | B2 | 7/2007 | Hein et al. | |
| 7,254,775 | B2 | 8/2007 | Geaghan et al. | |
| 7,255,466 | B2 | 8/2007 | Schmidt et al. | |
| 7,255,622 | B2 | 8/2007 | Stevenson et al. | |
| 7,269,484 | B2 | 9/2007 | Hein | |
| 7,295,168 | B2 | 11/2007 | Saegusa et al. | |
| 7,295,904 | B2 | 11/2007 | Kanevsky et al. | |
| 7,339,579 | B2 | 3/2008 | Richter et al. | |
| 7,342,485 | B2 | 3/2008 | Joehl et al. | |
| 7,355,595 | B2 | 4/2008 | Bathiche et al. | |
| 7,361,860 | B2 | 4/2008 | Caldwell | |
| 7,385,308 | B2 | 6/2008 | Yerdon et al. | |
| 7,445,350 | B2 | 11/2008 | Konet et al. | |
| 7,479,788 | B2 | 1/2009 | Bolender et al. | |
| 7,489,053 | B2 | 2/2009 | Gentile et al. | |
| 7,521,941 | B2 | 4/2009 | Ely et al. | |
| 7,521,942 | B2 | 4/2009 | Reynolds | |
| 7,531,921 | B2 | 5/2009 | Cencur | |
| 7,532,202 | B2 | 5/2009 | Roberts | |
| 7,535,131 | B1 | 5/2009 | Safieh, Jr. | |
| 7,535,459 | B2 | 5/2009 | You et al. | |
| 7,567,240 | B2 | 7/2009 | Peterson, Jr. et al. | |
| 7,583,092 | B2 | 9/2009 | Reynolds et al. | |
| 7,643,010 | B2 | 1/2010 | Westerman et al. | |
| 7,653,883 | B2 | 1/2010 | Hotelling et al. | |
| 7,688,080 | B2 | 3/2010 | Golovchenko et al. | |
| 7,701,440 | B2 | 4/2010 | Harley | |
| 7,705,257 | B2 | 4/2010 | Arione et al. | |
| 7,708,120 | B2 | 5/2010 | Einbinder | |
| 7,710,245 | B2 * | 5/2010 | Pickering | 340/426.28 |
| 7,714,846 | B1 | 5/2010 | Gray | |
| 7,719,142 | B2 | 5/2010 | Hein et al. | |
| 7,728,819 | B2 | 6/2010 | Inokawa | |
| 7,737,953 | B2 | 6/2010 | Mackey | |
| 7,737,956 | B2 | 6/2010 | Hsieh et al. | |
| 7,777,732 | B2 | 8/2010 | Herz et al. | |
| 7,782,307 | B2 | 8/2010 | Westerman et al. | |
| 7,791,594 | B2 | 9/2010 | Dunko | |
| 7,795,882 | B2 | 9/2010 | Kirchner et al. | |
| 7,800,590 | B2 | 9/2010 | Satoh et al. | |
| 7,821,425 | B2 | 10/2010 | Philipp | |
| 7,834,853 | B2 | 11/2010 | Finney et al. | |
| 7,839,392 | B2 | 11/2010 | Pak et al. | |
| 7,876,310 | B2 | 1/2011 | Westerman et al. | |
| 7,881,940 | B2 | 2/2011 | Dusterhoff | |
| RE42,199 | E | 3/2011 | Caldwell | |
| 7,898,531 | B2 | 3/2011 | Bowden et al. | |
| 7,920,131 | B2 | 4/2011 | Westerman | |
| 7,924,143 | B2 | 4/2011 | Griffin et al. | |
| 7,957,864 | B2 | 6/2011 | Lenneman et al. | |
| 7,977,596 | B2 | 7/2011 | Born et al. | |
| 7,978,181 | B2 | 7/2011 | Westerman | |
| 7,989,752 | B2 | 8/2011 | Yokozawa | |
| 8,026,904 | B2 | 9/2011 | Westerman | |
| 8,050,876 | B2 | 11/2011 | Feen et al. | |
| 8,054,296 | B2 | 11/2011 | Land et al. | |
| 8,054,300 | B2 | 11/2011 | Bernstein | |
| 8,077,154 | B2 | 12/2011 | Emig et al. | |
| 8,090,497 | B2 | 1/2012 | Ando | |
| 8,253,425 | B2 | 8/2012 | Reynolds et al. | |
| 8,283,800 | B2 | 10/2012 | Salter et al. | |
| 8,330,385 | B2 | 12/2012 | Salter et al. | |
| 8,339,286 | B2 | 12/2012 | Cordeiro | |
| 8,454,181 | B2 | 6/2013 | Salter et al. | |
| 8,508,487 | B2 | 8/2013 | Schwesig et al. | |
| 8,517,383 | B2 | 8/2013 | Wallace et al. | |
| 8,537,107 | B1 | 9/2013 | Li | |
| 8,575,949 | B2 | 11/2013 | Salter et al. | |
| 2001/0019228 | A1 | 9/2001 | Gremm | |
| 2001/0028558 | A1 | 10/2001 | Rapp et al. | |
| 2002/0040266 | A1 | 4/2002 | Edgar et al. | |
| 2002/0084721 | A1 | 7/2002 | Walczak | |
| 2002/0093786 | A1 | 7/2002 | Maser | |
| 2002/0149376 | A1 | 10/2002 | Haffner et al. | |
| 2002/0167439 | A1 | 11/2002 | Bloch et al. | |
| 2002/0167704 | A1 | 11/2002 | Kleinhans et al. | |
| 2003/0002273 | A1 | 1/2003 | Anderson, Jr. et al. | |
| 2003/0101781 | A1 * | 6/2003 | Budzynski et al. | 70/239 |
| 2003/0122554 | A1 | 7/2003 | Karray et al. | |
| 2003/0128116 | A1 * | 7/2003 | Ieda et al. | 340/562 |
| 2004/0056753 | A1 | 3/2004 | Chiang et al. | |
| 2004/0145613 | A1 | 7/2004 | Stavely et al. | |
| 2004/0160072 | A1 | 8/2004 | Carter et al. | |
| 2004/0160234 | A1 | 8/2004 | Denen et al. | |
| 2004/0160713 | A1 | 8/2004 | Wei | |
| 2004/0197547 | A1 | 10/2004 | Bristow et al. | |
| 2004/0246239 | A1 | 12/2004 | Knowles et al. | |
| 2005/0052429 | A1 | 3/2005 | Philipp | |
| 2005/0068712 | A1 | 3/2005 | Schulz et al. | |
| 2005/0088417 | A1 | 4/2005 | Mulligan | |
| 2005/0110769 | A1 | 5/2005 | DaCosta et al. | |
| 2005/0137765 | A1 | 6/2005 | Hein et al. | |
| 2005/0242923 | A1 | 11/2005 | Pearson et al. | |
| 2005/0275567 | A1 | 12/2005 | DePue et al. | |
| 2006/0022682 | A1 | 2/2006 | Nakamura et al. | |
| 2006/0038793 | A1 | 2/2006 | Philipp | |
| 2006/0044800 | A1 | 3/2006 | Reime | |
| 2006/0082545 | A1 | 4/2006 | Choquet et al. | |
| 2006/0170241 | A1 * | 8/2006 | Yamashita | 296/146.4 |
| 2006/0244733 | A1 | 11/2006 | Geaghan | |
| 2006/0262549 | A1 | 11/2006 | Schmidt et al. | |
| 2006/0267953 | A1 | 11/2006 | Peterson, Jr. et al. | |
| 2006/0279015 | A1 | 12/2006 | Wang | |
| 2006/0287474 | A1 | 12/2006 | Crawford et al. | |
| 2007/0008726 | A1 | 1/2007 | Brown | |
| 2007/0023265 | A1 | 2/2007 | Ishikawa et al. | |
| 2007/0051609 | A1 | 3/2007 | Parkinson | |
| 2007/0068790 | A1 | 3/2007 | Yerdon et al. | |
| 2007/0096565 | A1 | 5/2007 | Breed et al. | |
| 2007/0103431 | A1 | 5/2007 | Tabatowski-Bush | |
| 2007/0226994 | A1 | 10/2007 | Wollach et al. | |
| 2007/0232779 | A1 | 10/2007 | Moody et al. | |
| 2007/0247429 | A1 | 10/2007 | Westerman | |
| 2007/0255468 | A1 | 11/2007 | Strebel et al. | |
| 2007/0257891 | A1 | 11/2007 | Esenther et al. | |
| 2007/0296709 | A1 | 12/2007 | GuangHai | |
| 2008/0012835 | A1 | 1/2008 | Rimon et al. | |
| 2008/0018604 | A1 | 1/2008 | Paun et al. | |
| 2008/0023715 | A1 | 1/2008 | Choi | |
| 2008/0030465 | A1 | 2/2008 | Konet et al. | |
| 2008/0074398 | A1 | 3/2008 | Wright | |
| 2008/0111714 | A1 | 5/2008 | Kremin | |
| 2008/0136792 | A1 | 6/2008 | Peng et al. | |
| 2008/0142352 | A1 | 6/2008 | Wright | |
| 2008/0143681 | A1 | 6/2008 | XiaoPing | |
| 2008/0150905 | A1 | 6/2008 | Grivna et al. | |
| 2008/0158146 | A1 | 7/2008 | Westerman | |
| 2008/0196945 | A1 | 8/2008 | Konstas | |
| 2008/0202912 | A1 | 8/2008 | Boddie et al. | |
| 2008/0231290 | A1 | 9/2008 | Zhitomirsky | |
| 2008/0238650 | A1 | 10/2008 | Riihimaki et al. | |
| 2008/0257706 | A1 | 10/2008 | Haag | |
| 2008/0272623 | A1 | 11/2008 | Kadzban et al. | |
| 2009/0066659 | A1 | 3/2009 | He et al. | |
| 2009/0079699 | A1 | 3/2009 | Sun | |
| 2009/0108985 | A1 | 4/2009 | Haag et al. | |
| 2009/0115731 | A1 | 5/2009 | Rak | |
| 2009/0120697 | A1 | 5/2009 | Wilner et al. | |
| 2009/0135157 | A1 | 5/2009 | Harley | |
| 2009/0225043 | A1 | 9/2009 | Rosener | |
| 2009/0235588 | A1 | 9/2009 | Patterson et al. | |
| 2009/0236210 | A1 | 9/2009 | Clark et al. | |
| 2009/0251435 | A1 | 10/2009 | Westerman et al. | |
| 2009/0256677 | A1 * | 10/2009 | Hein et al. | 340/5.72 |

(56) References Cited

U.S. PATENT DOCUMENTS

2009/0309616 A1 12/2009 Klinghult et al.
2010/0001974 A1 1/2010 Su et al.
2010/0007613 A1 1/2010 Costa
2010/0007620 A1 1/2010 Hsieh et al.
2010/0013777 A1 1/2010 Baudisch et al.
2010/0026654 A1 2/2010 Suddreth
2010/0039392 A1 2/2010 Pratt et al.
2010/0090712 A1 4/2010 Vandermeijden
2010/0090966 A1 4/2010 Gregorio
2010/0102830 A1 4/2010 Curtis et al.
2010/0103139 A1 4/2010 Soo et al.
2010/0110037 A1 5/2010 Huang et al.
2010/0125393 A1 5/2010 Jarvinen et al.
2010/0156814 A1 6/2010 Weber et al.
2010/0177057 A1 7/2010 Flint et al.
2010/0188356 A1 7/2010 Vu et al.
2010/0188364 A1 7/2010 Lin et al.
2010/0194692 A1 8/2010 Orr et al.
2010/0207907 A1 8/2010 Tanabe et al.
2010/0212819 A1 8/2010 Salter et al.
2010/0214253 A1 8/2010 Wu et al.
2010/0219935 A1* 9/2010 Bingle et al. ................. 340/5.54
2010/0241431 A1 9/2010 Weng et al.
2010/0241983 A1 9/2010 Walline et al.
2010/0245286 A1 9/2010 Parker
2010/0250071 A1 9/2010 Pala et al.
2010/0277431 A1 11/2010 Klinghult
2010/0280983 A1 11/2010 Cho et al.
2010/0286867 A1 11/2010 Bergholz et al.
2010/0289754 A1 11/2010 Sleeman et al.
2010/0289759 A1 11/2010 Fisher et al.
2010/0296303 A1 11/2010 Sarioglu et al.
2010/0302200 A1 12/2010 Netherton et al.
2010/0315267 A1 12/2010 Chung et al.
2010/0321214 A1 12/2010 Wang et al.
2010/0321321 A1 12/2010 Shenfield et al.
2010/0321335 A1 12/2010 Lim et al.
2010/0328261 A1 12/2010 Woolley et al.
2010/0328262 A1 12/2010 Huang et al.
2011/0001707 A1 1/2011 Faubert et al.
2011/0001722 A1 1/2011 Newman et al.
2011/0007021 A1 1/2011 Bernstein et al.
2011/0007023 A1 1/2011 Abrahamsson et al.
2011/0012623 A1 1/2011 Gastel et al.
2011/0018744 A1 1/2011 Philipp
2011/0018817 A1 1/2011 Kryze et al.
2011/0022393 A1 1/2011 Waller et al.
2011/0031983 A1 2/2011 David et al.
2011/0034219 A1 2/2011 Filson et al.
2011/0037725 A1 2/2011 Pryor
2011/0037735 A1 2/2011 Land et al.
2011/0039602 A1 2/2011 McNamara et al.
2011/0041409 A1 2/2011 Newman et al.
2011/0043481 A1 2/2011 Bruwer
2011/0050251 A1 3/2011 Franke et al.
2011/0050587 A1 3/2011 Natanzon et al.
2011/0050618 A1 3/2011 Murphy et al.
2011/0050620 A1 3/2011 Hristov
2011/0055753 A1 3/2011 Horodezky et al.
2011/0062969 A1 3/2011 Hargreaves et al.
2011/0063425 A1 3/2011 Tieman
2011/0074573 A1 3/2011 Seshadri
2011/0080365 A1 4/2011 Westerman
2011/0080366 A1 4/2011 Bolender
2011/0080376 A1 4/2011 Kuo et al.
2011/0082616 A1 4/2011 Small et al.
2011/0083110 A1 4/2011 Griffin et al.
2011/0095997 A1 4/2011 Philipp
2011/0115732 A1 5/2011 Coni et al.
2011/0115742 A1 5/2011 Sobel et al.
2011/0134047 A1 6/2011 Wigdor et al.
2011/0134054 A1 6/2011 Woo et al.
2011/0141006 A1 6/2011 Rabu
2011/0141041 A1 6/2011 Parkinson et al.
2011/0148803 A1 6/2011 Xu
2011/0157037 A1 6/2011 Shamir et al.
2011/0157079 A1 6/2011 Wu et al.
2011/0157080 A1 6/2011 Ciesla et al.
2011/0157089 A1 6/2011 Rainisto
2011/0161001 A1 6/2011 Fink
2011/0169758 A1 7/2011 Aono
2011/0187492 A1 8/2011 Newman et al.
2011/0279276 A1 11/2011 Newham
2011/0279409 A1 11/2011 Salaverry et al.
2011/0309912 A1* 12/2011 Muller ......................... 340/5.72
2012/0007821 A1 1/2012 Zaliva
2012/0037485 A1 2/2012 Sitarski
2012/0043976 A1 2/2012 Bokma et al.
2012/0055557 A1 3/2012 Belz et al.
2012/0062247 A1 3/2012 Chang
2012/0062498 A1 3/2012 Weaver et al.
2012/0068956 A1 3/2012 Jira et al.
2012/0154324 A1 6/2012 Wright et al.
2012/0217147 A1 8/2012 Porter et al.
2012/0312676 A1 12/2012 Salter et al.
2012/0313648 A1 12/2012 Salter et al.
2013/0024169 A1* 1/2013 Veerasamy ....................... 703/2
2013/0036529 A1 2/2013 Salter et al.
2013/0076121 A1 3/2013 Salter et al.
2013/0093500 A1 4/2013 Bruwer
2013/0106436 A1 5/2013 Brunet et al.
2013/0113397 A1 5/2013 Salter et al.
2013/0113544 A1 5/2013 Salter et al.
2013/0126325 A1 5/2013 Curtis et al.
2013/0270896 A1 10/2013 Buttolo et al.
2013/0270899 A1 10/2013 Buttolo et al.
2013/0271157 A1 10/2013 Buttolo et al.
2013/0271159 A1 10/2013 Santos et al.
2013/0271182 A1 10/2013 Buttolo et al.
2013/0271202 A1 10/2013 Buttolo et al.
2013/0271203 A1 10/2013 Salter et al.
2013/0271204 A1 10/2013 Salter et al.
2013/0291439 A1 11/2013 Wuerstlein et al.
2013/0307610 A1 11/2013 Salter et al.
2013/0321065 A1 12/2013 Salter et al.
2013/0328616 A1 12/2013 Buttolo et al.
2014/0002405 A1 1/2014 Salter et al.
2014/0145733 A1 5/2014 Buttolo et al.

FOREIGN PATENT DOCUMENTS

EP 1327860 7/2003
EP 1562293 8/2005
EP 2133777 10/2011
EP 2133777 B1 10/2011
GB 2071338 9/1981
GB 2158737 11/1985
GB 2279750 1/1995
GB 2409578 6/2005
GB 2418741 4/2006
JP 61188515 8/1986
JP 4065038 3/1992
JP 04082416 3/1992
JP 07315880 12/1995
JP 08138446 5/1996
JP 11065764 3/1999
JP 11110131 4/1999
JP 11260133 9/1999
JP 11316553 11/1999
JP 2000047178 2/2000
JP 2000075293 3/2000
JP 2001013868 1/2001
JP 2006007764 1/2006
JP 2007027034 2/2007
JP 2008033701 2/2008
JP 2010139362 6/2010
JP 2010165618 7/2010
JP 2010218422 9/2010
JP 2010239587 A 10/2010
JP 2010287148 12/2010
JP 2011014280 1/2011
KR 20040110463 12/2004
KR 20090127544 12/2009
KR 20100114768 10/2010

(56) References Cited

FOREIGN PATENT DOCUMENTS

| | | | |
|---|---|---|---|
| WO | 9636960 | | 11/1996 |
| WO | 9963394 | | 12/1999 |
| WO | 2006093398 | | 9/2006 |
| WO | 2007022027 | | 2/2007 |
| WO | 2008121760 | | 10/2008 |
| WO | 2009054592 | | 4/2009 |
| WO | 2010111362 | | 9/2010 |
| WO | 2012032318 | | 3/2012 |
| WO | 2012032318 | A1 | 3/2012 |
| WO | 2012169106 | | 12/2012 |
| WO | 2012169106 | A1 | 12/2012 |

OTHER PUBLICATIONS

U.S. Appl. No. 13/799,413, filed Mar. 13, 2013, entitled “Proximity Interface Development System Having Replicator and Method,” (29 pages of specification and 20 pages of drawings) and Official Filing Receipt (3 pages).

U.S. Appl. No. 13/799,478, filed Mar. 13, 2013, entitled “Proximity Interface Development System Having Analyzer and Method,” (29 pages of specification and 20 pages of drawings) and Official Filing Receipt (3 pages).

U.S. Appl. No. 14/168,614, filed Jan. 30, 2014, entitled “Proximity Switch Assembly and Activation Method Having Virtual Button Mode,” (30 pages of specification and 15 pages of drawings) and Official Filing Receipt (3 pages).

“Touch Sensors Design Guide” by ATMEL, 10620 D-AT42-04/09, Revised Apr. 2009, 72 pages, Copyrighted 2008-2009 Atmel Corporation.

“Capacitive Tough Switches for Automotive Applications,” by Dave Van Ess of Cypress Semiconductor Corp., Published in Automotive DesignLine (http://www.automotivedesignline.com), Feb. 2006, 7 pages.

“Clevios P Formulation Guide,” 12 pages, www.clevios.com, Heraeus Clevios GmbH, no date provided.

“Introduction to Touch Solutions, White Paper, Rivision 1.0 A,” Densitron Corporation, 14 pages, Aug. 21, 2007.

Kliffken, Marksu G. et al., “Obstacle Detection for Power Operated Window-Lift and Sunroof Actuation Systems,” Paper No. 2001-01-0466, 1 page, ©2011 SAE International, Published Mar. 5, 2001.

NXP Capacitive Sensors, 1 page, www.nxp.com, copyrighted 2006-2010, NXP Semiconductors.

“Moisture Immunity in QuickSense Studio,” AN552, Rev. 0.1 10/10, 8 pages, Silicon Laboratories, Inc., © 2010.

“Orgacon EL-P3000, Screen printing Ink Series 3000,” 2 pages, AGFA, last updated in Feb. 2006.

“Charge-Transfer Sensing-Based Touch Controls Facilitate Creative Interfaces,” www.ferret.com.au, 2 pages, Jan. 18, 2006.

Kiosk Peripherals, “Touch Screen,” www.bitsbytesintegrators.com/kiosk-peripherals.html, 10 pages, no date provided.

JVC KD-AVX777 Detachable Front-Panel with Integrated 5.4" Touch-Screen Monitor, 6 pages, www.crutchfield.com, no date provided.

Ergonomic Palm Buttons, Pepperl+Fuchs, www.wolfautomation.com, 6 pages, no date provided.

U.S. Appl. No. 14/314,328, filed Jun. 25, 2014, entitled “Proximity Switch Assembly Having Pliable Surface and Depression,” (43 pages of specification and 24 pages of drawings) and Official Filing Receipt (3 pages).

U.S. Appl. No. 14/314,364, filed Jun. 25, 2014, entitled “Proximity Switch Assembly Having Groove Between Adjacent Proximity Sensors,” (43 pages of specification and 24 pages of drawings) and Official Filing Receipt (3 pages).

* cited by examiner

PROXIMITY SWITCH BASED DOOR LATCH RELEASE

FIELD OF THE INVENTION

The present invention generally relates to door latch release assemblies, and more particularly relates to a proximity sensor based latch assembly that releases a vehicle door latch to allow the door to open.

BACKGROUND OF THE INVENTION

Automotive vehicles include various door assemblies for allowing access to the vehicle, such as passenger doors allowing access to the passenger compartment. The vehicle doors typically include a mechanical latch assembly that latches the door in the closed position and is operable by a user to unlatch the door to allow the door to open. For example, a passenger may actuate a pivoting release mechanism by pulling on the mechanism to unlatch the vehicle door. The latch may be locked further with a door lock mechanism that typically is actuated with another input by the user.

SUMMARY OF THE INVENTION

According to one aspect of the present invention, a door latch assembly is provided. The door latch assembly includes a first proximity sensor on a first side of a door handle and a second proximity sensor on a second side of the door handle. The door latch assembly also includes a latch operative to latch the door closed and to unlatch the door to allow the door to open. The door latch assembly further includes control circuitry for activating the latch to unlatch the door based on an object sensed with both the first and second proximity sensors.

According to another aspect of the present invention, a vehicle door latch assembly is provided. The vehicle door latch assembly includes a first proximity sensor located on a first side of a vehicle door handle and a second proximity sensor located on a second side of the vehicle door handle. The vehicle door latch assembly also includes a latch operative to latch the door closed and to unlatch the door open. The vehicle door latch assembly further includes control circuitry for activating the latch to unlatch the door based on an object sensed with both the first and second proximity sensors.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
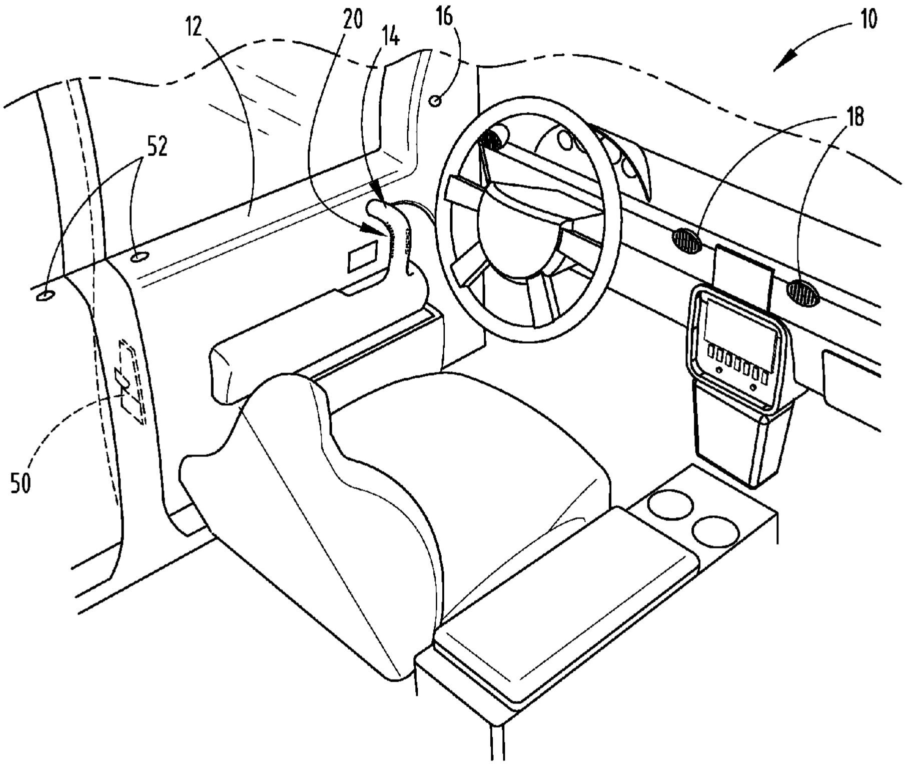
FIG. 1 is a perspective view of a passenger compartment of an automotive vehicle having a vehicle door employing a proximity sensor activated door latch assembly, according to one embodiment.
Figure 2:
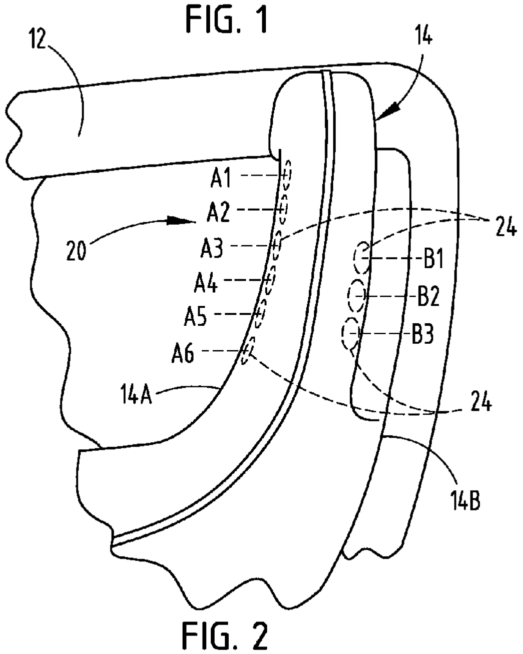
FIG. 2 is an enlarged side view of the door handle showing the door latch assembly on the grip portion of the door handle.

Referring to FIGS. 1 and 2, an interior of an automotive vehicle 10 is generally illustrated having a passenger compartment and a vehicle door 12 that may be in the closed position as shown in FIG. 1 or may pivot about hinge assemblies (not shown) to an open position to allow access to the passenger compartment. The door 12 has a handle 14 with a grip portion that allows an operator's hand to grip the handle 14 to forcibly swing the door 12 between open and closed positions. The door 12 also includes a latch assembly 20 for latching the door 12 in the closed position to maintain the door closed and for unlatching the door to allow the door to open to an open position. The latch assembly 20 includes an actuatable latch such as an electromagnetic actuated latch 50 that changes the position of the latch between latched and unlatched positions in response to a control signal. While the vehicle 10 is shown having a front driver side door 12, it should be appreciated that the vehicle may be equipped with a plurality of doors each employing the latch assembly 20 as described herein.

The latch assembly 20 employs a plurality of proximity sensors 24 on the grip portion of the handle 14 to allow an operator to actuate the latch 50 to the unlatched position to release the door and allow the door to open. Included are at least first and second proximity sensors on first and second sides of the door handle for sensing an object, such as an operator's hand gripping the handle. Control circuitry activates the latch via a control signal to unlatch the door 12 based on an object sensed with both the first and second proximity sensors 24. As such, the first and second proximity sensors 24 operate together as a proximity switch to switch the latch 50 to the unlatched position when both the first and second proximity sensors detect an adult hand gripping the handle. Additionally, the proximity sensors 24 may be employed to allow an operator to lock and unlock the latch assembly 20 as described herein.

The vehicle 10 further includes one or more warning lights 16, such as light 16 forward of the driver seat shown in the A-pillar in FIG. 1. Warning light 16 may serve as a visual indication of a sensed condition of the proximity sensors such as to indicate an inadvertent contact of an object on one of the first and second sensors. Additionally, one or more audio speakers 18 are provided in the vehicle to provide a chime output warning to provide a sound indication to alert the passenger(s) of an inadvertent contact of an object on one of the sensors as described herein and to alert the driver or occupant of an anticipated activation of the latch when the vehicle is not in park or is in motion.

Figure 3:
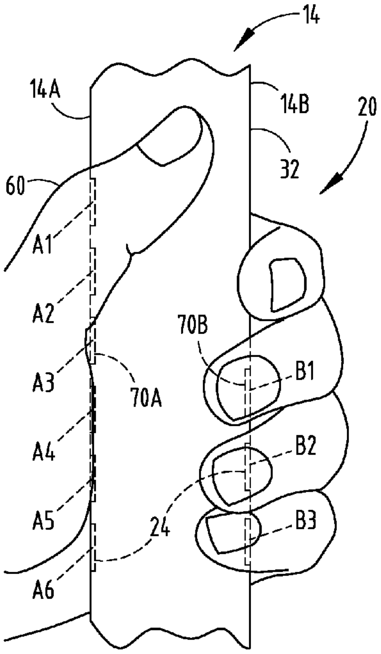
FIG. 3 is an enlarged partial view of the handle grip portion further illustrating an operator hand gripping the grip portion to unlatch the door.
Figure 4:
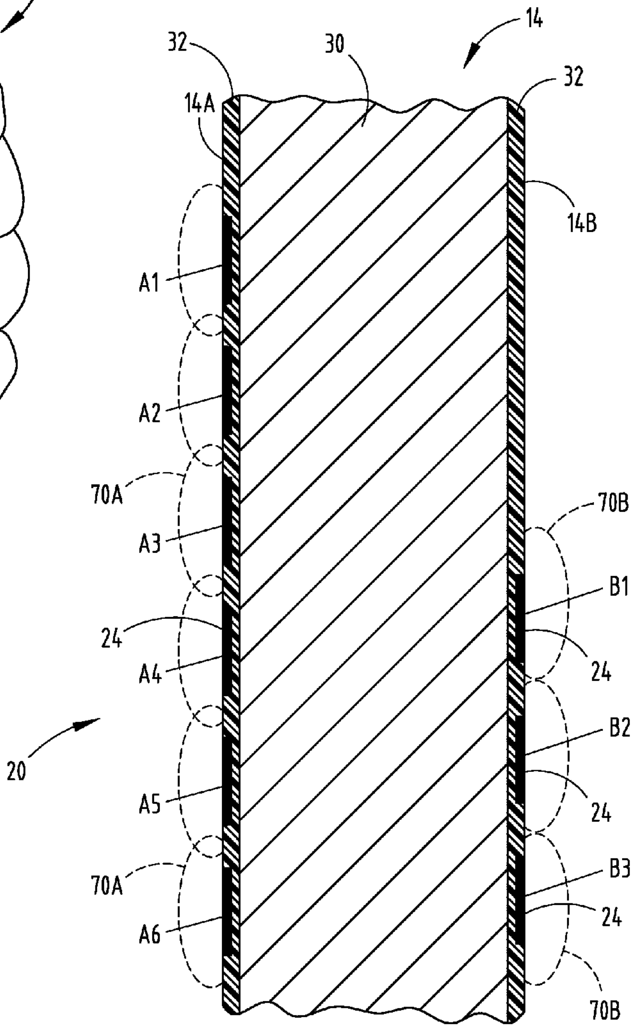
FIG. 4 is an enlarged cross-sectional view taken through the door handle further illustrating the array of proximity sensors and corresponding activation fields.

Referring to FIGS. 2-4, the handle 14 employing the latch assembly 20 is further illustrated having a plurality of proximity sensors 24, also labeled and referred to as first proximity sensors A1-A6 and second proximity sensors B1-B3 arranged on first and second sides 14A and 14B of the grip portion of the handle 14. In one embodiment, a first linear array of proximity sensors A1-A6 are arranged on a first side of the handle 14 and a second linear array of proximity sensors B1-B3 are arranged on a second opposite side of the handle 14. The first array of proximity sensors A1-A6 extends vertically on one side 14A and the second array of proximity sensors B1-B3 extends vertically on the opposite side 14B. The first and second arrays of proximity sensors A1-A6 and B1-B3 are of a size and positioned so as to be engaged by an operator's hand 60 as seen in FIG. 3. As an operator's hand 60 engages and grips the handle 14, the thumb and palm of the hand 60 come into contact or close proximity to one or more of the first array of proximity sensors A1-A6 and the fingers wrap around the handle 14 such that the fingers at an end closer to the proximal tip thereof come into contact or close proximity to the second array of proximity sensors B1-B3. The proximity sensors A1-A6 and B1-B3 thereby detect the simultaneous presence of an operator's hand on both first and second sides 14A and 14B of the handle 14 which is indicative of an operator gripping the handle 14 so as to initiate a latch open activation command to unlatch the latch and thereby releases the door such that the door may open.

In the embodiment shown, the first array of proximity sensors A1-A6 include six sensors and the second array of proximity sensors B1-B3 includes three sensors; however, it should be appreciated that one or more sensors may be employed in each of the first and second arrays of proximity sensors. Additionally, it should be appreciated that the first array of first proximity sensors A1-A6 and the second array of second proximity sensors B1-B3 are on opposite sides 14A and 14B of the handle 14, according to one embodiment. However, the first and second array of proximity sensors may be provided on different sides of the handle where the first side is at an angle greater than ninety degrees (90°) relative to the second side according to other embodiments. It should further be appreciated that the handle 14 and the proximity sensors 24 may be oriented in other directions other than the generally vertical orientation shown herein. It should be appreciated that by applying a second array of proximity sensors B1-B3 on the back side of the door handle in addition to the first array of proximity sensors A1-A6 on the front side of the door handle is achieved with minimal extra costs since both arrays of proximity sensors may be electrically coupled to shared control circuitry and processed together therewith.

The proximity sensors 24 are shown and described herein as capacitive sensors, according to one embodiment. Each proximity sensor 24 includes at least one proximity sensor that provides a sense activation field to sense contact or close proximity (e.g., within one millimeter) of an object, such as the hand (e.g., palm or finger(s)) of an operator in relation to the one or more proximity sensors. Thus, the first and second arrays of capacitive sensors operate as a capacitive switch. The proximity sensors 24 may also detect a swiping motion by the hand of the operator such as a swipe of the thumb or other finger. Thus, the sense activation field of each proximity sensor 24 is a capacitive field in the exemplary embodiment and the user's hand including the palm, thumb and other fingers have electrical conductivity and dielectric properties that cause a change or disturbance in the sense activation field as should be evident to those skilled in the art. However, it should also be appreciated by those skilled in the art that additional or alternative types of proximity sensors can be used, such as, but not limited to, inductive sensors, optical sensors, temperatures sensors, resistive sensors, the like, or a combination thereof. Exemplary proximity sensors are described in the Apr. 9, 2009, ATMEL® Touch Sensors Design Guide, 10620 D-AT42-04/09, the entire reference hereby being incorporated herein by reference.

Referring to FIG. 4, the door handle 14 is shown having the capacitive sensors A1-A6 and B1-B3 formed on the outer surface of an inner substrate 30 of handle 14. Alternatively, the sensors could be formed on the inner surface of an outer covering layer 32 overlaying the inner substrate 30. According to one embodiment, each of the proximity sensors 24 may be formed by printing conductive ink onto the outer surface of the inner substrate 30 which provides the support for the handle 14 such that a user is able to grip the handle 14 and push the handle 14 to open the door 12 or pull the handle 14 to close the door 12. The door handle 14 should be sufficiently rigid and strong to allow an operator to easily swing the door 14 between open and closed positions.

Figure 5:
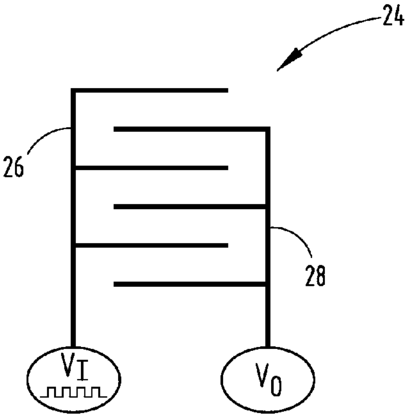
FIG. 5 is a schematic diagram of a capacitive sensor employed in each of the proximity capacitive sensors shown in FIGS. 1-4.

One example of the printed ink proximity sensor 24 is shown in FIG. 5 having a drive electrode 26 and a receive electrode 28 each having interdigitated fingers for generating a capacitive field. It should be appreciated that each of the proximity sensors 24 may be otherwise formed such as by assembling a preformed conductive circuit trace onto a substrate according to other embodiments. The drive electrode 26 receives square wave drive pulses applied at voltage $V_I$. The receive electrode 28 has an output for generating an output voltage $V_O$. It should be appreciated that the electrodes 26 and 28 may be arranged in various other configurations for generating the capacitive field as the activation field.

In the embodiment shown and described herein, the drive electrode 26 of each proximity sensor 24 is applied with voltage input $V_I$ as square wave pulses having a charge pulse cycle sufficient to charge the receive electrode 28 to a desired voltage. The receive electrode 28 thereby serves as a measurement electrode. In the embodiment shown, adjacent sense activation fields 70A or 70B generated by adjacent proximity sensors 24 overlap, however, more or less overlap may exist according to other embodiments. When a user or operator, such as the user's hand or thumb or other finger(s), enters an activation field, the latch assembly 20 detects the disturbance caused by the hand or fingers to the activation field and determines whether the disturbance in both activation fields 70A and 70B is sufficient to activate a door unlatch command. The disturbance of each activation field is detected by processing the charge pulse signal associated with the corresponding signal channel. When the user's hand or fingers enters the activation fields 70A or 70B generated by the first and second arrays of sensors A1-A6 and B1-B3, the latch assembly 20 detects the disturbance of each contacted activation field via separate signal channels. Each proximity sensor 24 may have its own dedicated signal channel generating charge pulse counts which may be processed.

Each of the first and second capacitive sensors A1-A6 and B1-B3 is shown generating a sense activation field 70A or 70B. The sense activation fields 70A and 70B generated by each individual sensor in each array are shown slightly overlapping, however, it should be appreciated that the activation fields may be smaller or larger and may overlap more or less depending on the sensitivity of the individual fields. By employing a plurality of activation fields on one or both sides of the handle 14, the size and shape of the hand gripping the handle 14 may be determined based on the size of the object being greater than a predetermined size. The size and shape of the hand can be determined based on the number of sensors contacted and/or amplitude of the activation fields. This enables the latch assembly 20 to determine whether an adult or a child is gripping the handle 14 such that activation of the latch may be prevented when a small handle indicative of a child is determined to be gripping the handle and allowed only when a large hand indicative of an adult is determined to be gripping the handle.

In addition, a gesture or swipe motion of the hand, such as a swipe or gesture motion of one or more of the thumb or other fingers may be determined by employing the plurality of capacitive sensors in one or more of the linear arrays. The operator may move one of the digits, such as the thumb, downward which may be sensed with sequential detection by the plurality of capacitive sensors A1-A6 as the thumb passes through each of the sensor activation fields 70A-70F sequentially to initiate a door lock command to lock the latch in the closed or latched position which prevents the door from opening. Contrarily, a digit, such as the thumb, may be moved upward and detected sequentially by the capacitive sensors 70A-70F indicative of a command to unlock the latch to allow the latch assembly to move to the unlatched position to thereby allow the door to be opened. Similarly, other digits or movement of the hand in general may be employed to move up or down and be detected as a swipe or gesture to initiate lock and unlock commands for the latch assembly 20.

Figure 6:
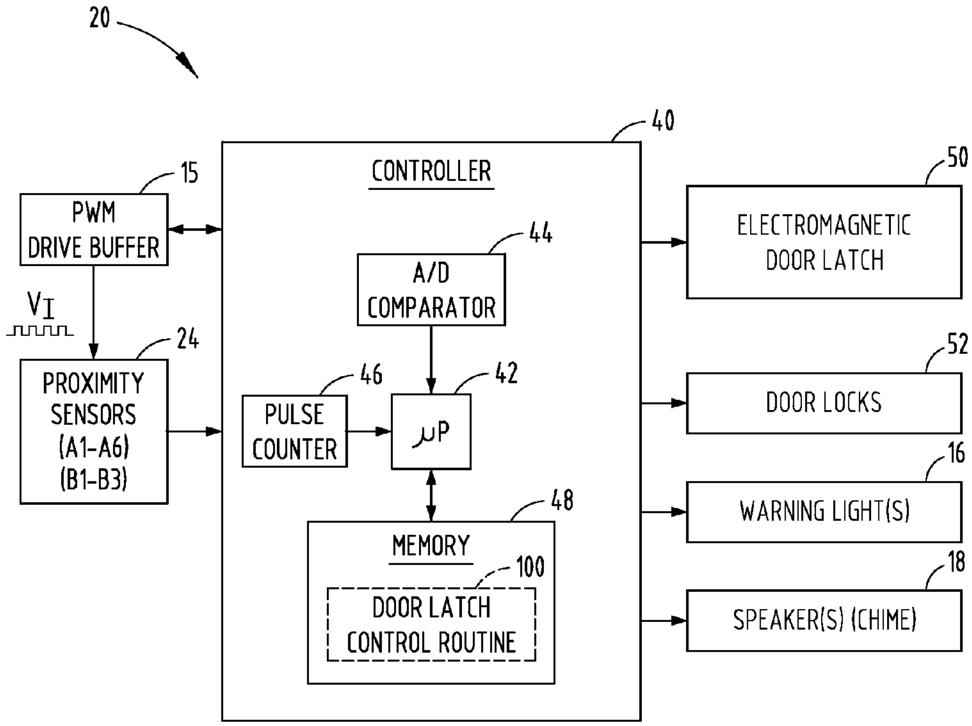
FIG. 6 is a block diagram illustrating the door latch assembly, according to one embodiment.
Figure 7:
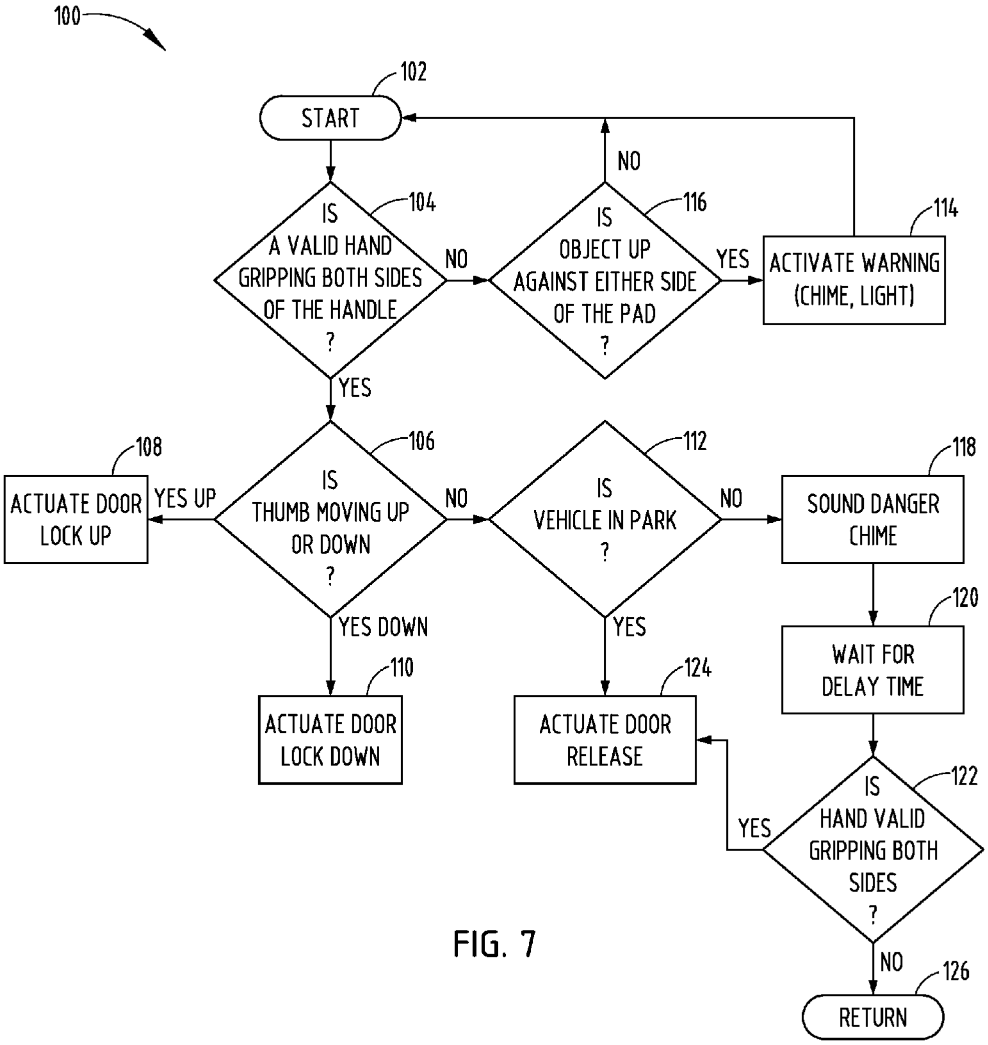
FIG. 7 is a flow diagram illustrating a routine for activating the vehicle door latch assembly, according to one embodiment.

Referring to FIG. 6, the proximity sensor activated latch assembly 20 is illustrated according to one embodiment. The plurality of proximity sensors 24 in sensor arrays A1-A6 and B1-B3 are shown providing inputs to a controller 40, such as a microcontroller. The controller 40 may include control circuitry, such as a microprocessor 42 and memory 48. The control circuitry may include sense control circuitry processing the activation field signal associated with each proximity sensor 24 to sense user activation of each sensor by comparing the activation field signal to one or more thresholds pursuant to one or more control routines. It should be appreciated that other analog and/or digital control circuitry may be employed to process each activation field signal, determine user activation, and initiate an action. The controller 40 may employ a QMatrix acquisition method available by ATMEL®, according to one embodiment. The ATMEL acquisition method employs a WINDOWS® host C/C++ compiler and debugger WinAVR to simplify development and testing the utility Hawkeye that allows monitoring in real-time the internal state of critical variables in the software as well as collecting logs of data for post-processing.

The controller 40 provides an output signal to one or more devices that are configured to perform dedicated actions responsive to detected activation of the proximity sensors on the door handle. The one or more devices may include an electromagnetic door latch 50 that is actuatable to move the latch to a first position or latch position to keep the door closed or to a second or unlatch position to allow the door to open. The electromagnetic door latch 50 may include a conventional electromagnetic actuated latch that moves the latch 50 between the first and second positions based on a control signal from the controller 40. It should be appreciated that other actuatable latches may be employed to move the latch 50 between the first and second positions, such as a pneumatic latch assembly, a motor, or other electrically activated mechanism.

The controller 40 also outputs a control signal to the door lock 52 to activate the door lock between locked and unlocked positions. The electromagnetic latch 50 may be operatively coupled to the door lock 52. When the door lock 52 is in the locked state, the electromagnetic door latch 50 is prevented from moving to the unlatch position. The electromagnetic door latch 50 may only unlatch to the unlatched position when the door lock 52 is in the unlocked position.

The controller 40 further provides output signals to one or more warning lights 16. The warning lights may include one or more LEDs or other light sources at a location visible to the occupant, such as a driver of the vehicle. The warning light(s) may be located in the A-pillar as shown in FIG. 1, or at other suitable locations. Additionally, controller 40 provides an output signal to one or more audio speakers to provide an audible chime sound indicative of a warning. The one or more of the warning lights 16 and speakers 18 may serve as warning indicators to the passengers in the vehicle when an object is detected in close proximity to the proximity sensors such as an inadvertent contact with one sensor or sensor array. The one or more warning lights 16 and speakers 18 may also serve as warning indicators when a potential door unlatch command is detected while the vehicle is not in park and may be moving. The warning may be followed by a time delay such as three seconds prior to unlatching the latch, thereby giving the operator time to consider the intended command.

The controller 40 is further shown having an analog to digital (A/D) comparator 44 coupled to the microprocessor 42. The A/D comparator 44 receives the voltage output $V_O$ from each of the proximity sensors 24, converts the analog signal to a digital signal, and provides the digital signal to the microprocessor 42. Additionally, controller 40 includes a pulse counter 46 coupled to the microprocessor 42. The pulse counter 46 counts the charge signal pulses that are applied to each drive electrode of each proximity sensor, performs a count of the pulses needed to charge the capacitor until the voltage output $V_O$ reaches a predetermined voltage, and provides the count to the microprocessor 42. The pulse count is indicative of the change in capacitance of the corresponding capacitive sensor. The controller 40 is further shown communicating with a pulse width modulated drive buffer 15. The controller 40 provides a pulse width modulated signal to the pulse width modulated drive buffer 15 to generate a square wave pulse train $V_I$ which is applied to each drive electrode of each proximity sensor 24. The controller 40 processes one or more control routines, shown in one embodiment including door latch control routine 100 stored in memory to monitor and make a determination as to activation of one of the proximity switches.

The door latch control routine 100 processes the various proximity sensors 24 and performs a method of sensing user input commanded on each of the proximity sensors and activating control of the latch assembly. Method 100 begins at step 102 and proceeds to decision step 104 to determine if a valid hand gripping is detected on both sides of the handle with the first and second proximity sensors. A valid hand grip may be detected when an object of a sufficient size greater than a predetermined size is detected on both sides of the grip portion of the handle. If a valid hand gripping is detected on the handle by the sensors, method 100 proceeds to decision step 106 to determine if the thumb or other digit on the hand is moving up or down. If the thumb or other digit of the hand is determined to be moving up, method 100 proceeds to step 108 to actuate the door lock up which is indicative of a door unlock command that unlocks the door lock to allow the latch assembly to activate the latch to the door open position. If the thumb or other digit is determined to be moving down, then method 100 proceeds to step 110 to actuate the door lock down which is indicative of a door lock command to prevent the latch from opening. If neither the thumb nor other digit is moving up or down, method 100 proceeds to step 112 to determine if the vehicle is in the park state which is indicative that the vehicle may be moving. The park state may be determined by the vehicle transmission or by vehicle speed. If the vehicle is in park, method 100 proceeds to step 124 to actuate the door latch to release to thereby allow the door to open. If the vehicle is not in park, method 100 activates a sound danger chime at step 118 to notify the occupants that the vehicle may still be moving at the time that a potential door latch release command is detected. Method 100 then waits for a delay time, such as three seconds before allowing the door latch to be released at step 124. The time delay thereby provides the operator sufficient time to disengage gripping of the handle if door actuation of the latch assembly is no longer the intended command. As such, method 100 will first determine if a valid hand gripping is detected on both sides at step 122 before actuating the door latch release to the unlatched position.

If a valid hand gripping on both sides of the handle is not detected at step 104, method 100 proceeds to decision step 116 to determine if an object is up against either side of the pad and, if so, activates a warning chime and/or light at step 114. Accordingly, if an object inadvertently is in close proximity to one or more of the capacitive sensors, a warning light or sound indicator is provided to the operator such that the operator may move the object from the capacitive sensors and not inadvertently release the latch and open the door.

Accordingly, the door latch assembly method advantageously allow for activation of the latch to unlatch the door based on an object sensed with first and second proximity sensors on first and second sides of the door handle. The system and method advantageously allows a user to effectively open the vehicle door without having to actuate a mechanical input lever, and thereby providing for a robust door release latch having fewer moving parts and which is cost-effective and easy to operate.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A door latch assembly comprising:

a first proximity sensor on a first side of a door handle;

a second proximity sensor on a second side of the door handle;

a latch operative to latch the door closed and to unlatch the door to allow the door to open; and control circuitry for activating the latch to unlatch the door based on an object sensed with both the first and second proximity sensors, wherein the control circuitry further detects movement of the object in a direction on one of the first and second proximity sensors and determines a swipe motion indicative of one of a door lock and unlock command, wherein the control circuitry causes the door latch to lock or unlock based on the command.

2. The door latch assembly of claim 1, wherein the control circuitry detects the object with both the first and second proximity sensors at the same time and generates an output signal to activate the latch to an unlatched position.

3. The door latch assembly of claim 1, wherein the first side is substantially opposite the second side.

4. The door latch assembly of claim 1, wherein the first side is at an angle greater than ninety degrees relative to the second side.

5. The door latch assembly of claim 1, wherein the latch comprises an electromagnetic latch.

6. The door latch assembly of claim 1, wherein the first and second proximity sensors comprise capacitive sensors.

7. The door latch assembly of claim 1, wherein the assembly is employed on a vehicle.

8. The door latch assembly of claim 1, wherein at least one of the first and second proximity sensors employs a plurality of proximity sensors.

9. A door latch assembly comprising:

a first proximity sensor on a first side of a door handle;

a second proximity sensor on a second side of the door handle;

a latch operative to latch the door closed and to unlatch the door to allow the door to open; and control circuitry or activating the latch to unlatch the door based on an object sensed with both the first and second proximity sensors, wherein the control circuitry determines a size of the object relative to one of the first and second proximity sensors based on a plurality of sensor fields and provides an output signal to the latch only when the size exceeds a predetermined size.

10. A vehicle door latch assembly comprising:

a first proximity sensor located on a first side of a vehicle door handle;

a second proximity sensor located on a second side of the vehicle door handle;

a latch operative to latch the door closed and to unlatch the door open; and control circuitry for activating the latch to unlatch the door based on an object sensed with both the first and second proximity sensors, wherein the control circuitry determines a size of the object relative to one of the first and second proximity sensors based on a plurality of sensor fields and provides an output signal to the latch only when the size exceeds a predetermined size.

11. The vehicle door latch assembly of claim 10, wherein the control circuitry detects the object with both the first and second proximity sensors at the same time and generates an output signal to activate the latch to the unlatched position.

12. The vehicle door latch assembly of claim 10, wherein the first side is substantially opposite the second side.

13. The vehicle door latch assembly of claim 10, wherein the first side is at an angle greater than ninety degrees relative to the second side.

14. The vehicle door latch assembly of claim 10, wherein the latch comprises an electromagnetic latch.

15. The vehicle door latch assembly of claim 10, wherein the control circuitry further detects movement of the object in a direction on one of the first and second proximity sensors and determines a swipe motion indicative of one of a door lock and unlock command, wherein the control circuitry causes the door latch to lock or unlock based on the command.

16. The vehicle door latch assembly of claim 10, wherein the first and second proximity sensors comprise capacitive sensors.

17. The vehicle door latch assembly of claim 10, wherein at least one of the first and second proximity sensors employs a plurality of proximity sensors.

* * * * *